United States Patent Office 3,025,276
Patented Mar. 13, 1962

3,025,276
COPOLYMERS
Richard F. Heck, Wilmington, Del., assignor to Hercules Powder Company, Wilmington, Del., a corporation of Delaware
No Drawing. Filed Apr. 14, 1960, Ser. No. 22,107
5 Claims. (Cl. 260—80.3)

The present invention relates to novel copolymers.

It is well known that vinyl alkyl ethers can be polymerized in bulk or in solution with Friedel-Crafts type catalysts to yield homopolymers that vary from viscous liquids to solids. It is likewise known that 1-alkoxybutadienes can be polymerized in solution with Friedel-Crafts type catalysts to yield homopolymers that are highly viscous and soluble in organic solvents. These materials have been used chiefly as plasticizers, etc., and because of their nature, their utility has been greatly limited.

The present invention is directed to novel high molecular weight polymers that possess many useful properties including the ability to be cross-linked into relatively insoluble masses by methods similar to those employed in the vulcanization of rubber. More specifically, the invention is directed to solid, at least partially crystalline, copolymers of 1-alkoxybutadienes and vinyl ethers selected from the group consisting of vinyl alkyl ethers, vinyl aralkyl ethers, vinyl cycloalkyl ethers, vinyl alkoxyalkyl ethers, vinyl cyanoalkyl ethers and vinyl nitroalkyl ethers, said copolymer comprising less than 10% of the 1-alkoxybutadiene.

Before describing the invention in greater detail, the following examples are illustrative of the preparation of the new copolymers, parts and percentages being by weight unless otherwise specified. The molecular weight of the copolymers in the examples is indicated by the reduced specific viscosity (RSV) given therein. By the term "reduced specific viscosity" is meant the specific viscosity, divided by the concentration of the solution in grams per 100 ml., measured at 25° C., on a solution in chloroform containing 0.1 gram of the copolymer in 100 ml. of the solution.

*Example 1*

The catalyst used in this and the following examples was prepared by mixing under nitrogen 7.9 parts of aluminum isopropoxide in heptane with 0.88 part of 100% sulfuric acid. The resulting slurry was shaken for 2 hours with glass beads and then allowed to stand at room temperature for 24 hours after which it was stored at −5° C. until used.

A polymerization vessel with a nitrogen atmosphere was charged with 66 parts of dry methylene chloride, 0.2 part of aluminum isopropoxide, as a 0.85 M solution in heptane, 7.5 parts of vinyl methyl ether and 0.8 part of 1-methoxybutadiene. The reaction mixture was cooled to 0° C., and then with agitation catalyst slurry equivalent to 0.03 part of catalyst was added. The reaction mixture was agitated at 0° C. for 2 hours and then at room temperature overnight, after which the copolymerization was stopped by adding 4 parts of a 1.0 M solution of ammonia in ethanol. There was then added 4 parts of a 1% solution of 4,4'-thiobis(6-tert-butyl-m-cresol) in ethanol as a stabilizer for the copolymer, and the reaction solution was evaporated to dryness under vacuum. The crude copolymer which remained as a residue was extracted with methanol. The methanol-insoluble product amounted to 2.9 parts of a solid copolymer having an RSV of 7.08. Infrared analysis showed that the copolymer contained 2.5 mole percent 1-methoxybutadiene and that it was approximately 30% crystalline.

Samples of the above copolymer were cross-linked (vulcanized) by two different methods as follows: (1) a mixture of 100 parts of the above copolymer, 25 parts of high abrasion furnace black, 2.5 parts of tetramethylthiuram disulfide, 5 parts of sulfur, 5 parts of zinc oxide, and 2 parts of stearic acid were milled together and then cured for 40 minutes at 154° C.; (2) a mixture of 100 parts of the above copolymer, 25 parts of high abrasion furnace black, 1.5 parts of 2-mercaptobenzothiazole, 2 parts of sulfur, 3 parts of zinc oxide and 2 parts of stearic acid were milled together and then cured for 40 minutes at 154° C. The percent gel and percent swell of each vulcanizate are tabulated below.

|  | Method 1— Sulfur-tetramethylthiuram disulfide | Method 2— Sulfur-2-mercaptobenzothiazole |
| --- | --- | --- |
| Percent Gel | 96 | 91 |
| Percent Swell | 620 | 1,380 |

The percent gel is indicative of the percentage of copolymer that is cross-linked, and the percent swell is inversely proportional to the tightness of cross-linking. The percent gel and percent swell are determined as follows: a weighted cylindrical sample of copolymer weighing about 100 mg. is soaked in an excess of toluene (30 cc.) in a closed container for 48 hours. The sample is then removed, blotted on filter paper without squeezing, so as to remove toluene on the surface, and weighed at once. The swollen sample is then dried in a current of air at room temperature over a 72-hour period to constant weight. The weights of initial and final sample are corrected for nonpolymer content based on knowledge of components. From these figures:

$$\frac{\text{Corrected dry weight}}{\text{Corrected initial weight}} \times 100 = \text{percent gel}$$

Similarly, percent swell is calculated by the formula:

$$\frac{\text{Corrected swollen weight} - \text{corrected dry weight}}{\text{Corrected dry weight}} \times 100 = \text{percent swell}$$

*Example 2*

A polymerization vessel with a nitrogen atmosphere was charged with 33 parts of dry methylene chloride, 0.16 part of aluminum isopropoxide, as a 0.72 M solution in heptane, 3.75 parts of vinyl methyl ether and 4 parts of 1-methoxybutadiene. The reaction mixture was cooled to 0° C. and then while continuously agitating the mixture 2 portions of catalyst slurry each equivalent to 0.03 part of catalyst were added one hour apart. The reaction and extraction were carried out as in Example 1. The methanol-insoluble product amounted to 1.37 parts of a solid copolymer having an RSV of 3.8. Infrared analysis showed that the copolymer contained about 2 mole percent 1-methoxybutadiene and that it was about 25% crystalline.

*Example 3*

A polymerization vessel with a nitrogen atmosphere was charged with 66 parts of dry methylene chloride, 0.5 part aluminum isopropoxide, as a 0.85 M solution in heptane, 7.5 parts of vinyl methyl ether and 8.0 parts of 1-methoxybutadiene. The reaction mixture was cooled to 0° C. and then with agitation catalyst slurry equivalent to 0.2 part of catalyst mixture was added. The reaction and extraction were carried out as in Example 1. The methanol-insoluble product amounted to 3.3 parts of a solid copolymer. An infrared analysis showed that the copolymer contained about 3.5 mole percent 1-methoxybutadiene.

As shown by the examples a 1-alkoxybutadiene can be copolymerized with a vinyl ether to produce new and useful copolymers. Exemplary of the vinyl ethers that can be copolymerized with a 1-alkoxybutadiene are: vinyl alkyl ethers, such as vinyl methyl ether, vinyl ethyl ether, vinyl propyl ether, vinyl isopropyl ether, vinyl n-butyl ether, vinyl tert-butyl ether, vinyl neopentyl ether, vinyl n-hexyl ether, vinyl 2-ethyl hexyl ether, vinyl stearyl ether, etc.; vinyl aralkyl ethers, such as vinyl benzyl ether, etc.; vinyl cycloalkyl ethers, such as vinyl cyclohexyl ether, vinyl cyclopentyl ether, etc.; vinyl alkoxyalkyl ethers, such as vinyl 2-methoxyethyl ether, vinyl 3-methoxypropyl ether, etc.; vinyl cyanoalkyl ethers, such as vinyl 2-cyanoethyl ether, vinyl 3-cyanopropyl ether, etc.; and vinyl nitroalkyl ethers, such as vinyl 2-nitroethyl ether, etc. Any one or any mixture of two or more of the above vinyl ethers can be copolymerized with the 1-alkoxybutadiene.

Exemplary of the 1-alkoxybutadienes that can be so copolymerized are: 1-methoxybutadiene, 1-ethoxybutadiene, 1-propoxybutadiene, 1-isopropoxybutadiene, 1-butoxybutadiene, 1-(2-methoxyethoxy)butadiene, etc.

The preparation of these new copolymers is readily carried out by contacting the monomers with a suitable catalyst. Preferred catalysts are the reaction products of an aluminum trialkyl or an aluminum trialkoxide with sulfuric acid. Another class of catalysts that is effective for the production of these copolymers includes the reaction products of a metallic sulfate and a metal alkyl or metal alkoxide. Exemplary of the foregoing class of catalysts are the reaction products of triethylaluminum, triisobutylaluminum, trihexylaluminum, etc., with sulfuric acid, the reaction products of aluminum isopropoxide, aluminum isobutoxide, etc., with sulfuric acid and the reaction products of aluminum sulfate with aluminum isopropoxide, titanium isopropoxide, etc.

The copolymerization is generally, for convenience of handling, carried out in an inert, liquid, organic diluent. Suitable diluents that can be used are: aliphatic, cycloaliphatic and aromatic hydrocarbons such as hexane, heptane, cyclohexane, benzene, toluene, xylene, etc., halogenated hydrocarbons such as methylene chloride, chloroform, carbon tetrachloride, chlorobenzene, etc., ethers such as diethyl ether, diisopropyl ether, etc., esters such as ethyl acetate, etc. In general, the reaction is carried out at a temperature of from about −50° C. to 100° C.

As stated above, the copolymers of this invention comprise less than 10 mole percent of the 1-alkoxybutadiene, which is a requisite for obtaining copolymers that are at least partially crystalline. On the other extreme, there is no precise minimum on the amount of 1-alkoxybutadiene but preferably the copolymers contain more than 0.5 mole percent of this monomer. In the preparation of these copolymers the proportion of monomers can be regulated according to procedures known to the art. The obtention of copolymers containing less than 10 mole percent of the 1-alkoxybutadiene is facilitated by the fact that the 1-alkoxybutadienes are often much less reactive than vinyl alkyl ethers, and large amounts of the former in proportion to the latter are required in the polymerization mixture to yield copolymers containing more than 10 mole percent of 1-alkoxybutadiene.

When the copolymerization is carried out as described above, the copolymer is readily isolated from the solution or slurry of copolymer and diluent by simply removing the diluent by evaporation or other such means. Frequently, it is desirable to add a stabilizer as the diluent is removed at an elevated temperature. The crude copolymer can, if desired, be extracted with methanol to remove catalyst residues and any low molecular weight materials which may have been formed.

For many applications, it may be desirable to incorporate antioxidants, pigments, fillers, plasticizers, etc., in these copolymers before fabrication, but the presence or absence of such additives is immaterial to the invention.

The copolymers of this invention are at least partially crystalline by infrared analysis. Preferably, their percent crystallinity is at least 10% and they preferably have an RSV of at least about 0.5.

The copolymers possess a variety of uses and can be injection molded, extruded or compression molded. They can be used in the form of oriented film for protective wrappings and as oriented fiber in tire cord, textile fibers, in resin reinforcement, in nonwoven fabrics, in rope, etc. Other uses will, of course, suggest themselves to the person skilled in the art.

When desired, the heat and solvent resistance of the copolymers can be raised by cross-linking. Cross-linking is easily effected by heating a copolymer in the presence of a suitable cross-linking agent or agents. The agents that can be used are quite varied. Typically, combinations of sulfur and an accelerator, such as used in rubber vulcanization, are effective in cross-linking the copolymers. Examples of useful cross-linking agents are combinations of sulfur and an alkyl thiuram sulfide such as tetramethylthiuram disulfide, tetraethylthiuram monosulfide, tetramethylthiuram tetrasulfide, etc., a dithiocarbamate such as zinc dimethyldithiocarbamate, tellurium diethyldithiocarbamate, etc., or a thiazole such as 2-mercaptobenzothiazole, 2-methyl mercaptobenzothiazole, 2-benzothiazole disulfide, etc. These copolymers are also capable of being cross-linked by sulfur alone due to the active double bonds remaining in the polymer. However, best results are obtained when the sulfur is combined with one of the above agents. The optimum amount of each cross-linking agent and the optimum conditions can be readily determined for any of the above copolymers.

What I claim and desire to protect by Letters Patent is:
1. A solid, at least partially crystalline, copolymer of a 1-alkoxybutadiene and a vinyl ether selected from the group consisting of vinyl alkyl ethers, vinyl aralkyl ethers, vinyl cycloalkyl ethers, vinyl alkoxyalkyl ethers, vinyl cyanoalkyl ethers and vinyl nitroalkyl ethers, said copolymer comprising less than 10 mole percent of the 1-alkoxybutadiene.
2. The product of claim 1 wherein the vinyl ether is a vinyl alkyl ether.
3. The product of claim 2 wherein the vinyl alkyl ether is vinyl methyl ether.
4. The product of claim 1 wherein the 1-alkoxybutadiene is 1-methoxybutadiene.
5. A solid, at least partially crystalline, copolymer of vinyl methyl ether and 1-methoxybutadiene, said copolymer comprising less than 10 mole percent of the 1-methoxybutadiene.

References Cited in the file of this patent

UNITED STATES PATENTS

| | | |
|---|---|---|
| 2,125,685 | Nicodemus et al. | Aug. 2, 1938 |
| 2,189,529 | Carothers et al. | Feb. 6, 1940 |
| 2,344,085 | Halbig et al. | Mar. 14, 1944 |